US012613675B2

(12) United States Patent
Lu et al.

(10) Patent No.: US 12,613,675 B2
(45) Date of Patent: Apr. 28, 2026

(54) AI CALCULATION CIRCUIT

(71) Applicant: Shenzhen Suanhai Technology Co., Ltd., Shenzhen (CN)

(72) Inventors: Chia-Lin Lu, Hsinchu (TW);
Yuan-Hsiang Kuo, Hsinchu (TW);
Wei-Chun Chang, Taoyuan (TW);
Tsung-Hsien Lin, Zhubei (TW);
Chin-Chung Yen, New Taipei (TW)

(73) Assignee: Shenzhen Suanhai Technology Co., Ltd., Shenzhen (CN)

( * ) Notice: Subject to any disclaimer, the term of this patent is extended or adjusted under 35 U.S.C. 154(b) by 1066 days.

(21) Appl. No.: 17/543,492

(22) Filed: Dec. 6, 2021

(65) Prior Publication Data

US 2022/0188074 A1     Jun. 16, 2022

(51) Int. Cl.
*G06F 7/544* (2006.01)
*G06F 7/485* (2006.01)
*G06F 7/487* (2006.01)
*G06F 7/57* (2006.01)
*G06N 3/02* (2006.01)

(52) U.S. Cl.
CPC ............ *G06F 7/5443* (2013.01); *G06F 7/485* (2013.01); *G06F 7/4876* (2013.01); *G06F 7/57* (2013.01); *G06F 2207/3812* (2013.01); *G06N 3/02* (2013.01)

(58) Field of Classification Search
CPC ........ G06F 7/5443; G06F 7/483; G06F 7/485; G06F 7/4876; G06F 7/57; G06F 2207/3812; G06F 2207/382; G06F 2207/3824
See application file for complete search history.

(56) References Cited

U.S. PATENT DOCUMENTS

| | | | | |
|---|---|---|---|---|
| 5,369,607 A * | 11/1994 | Okamoto | ................ | G06F 7/485 708/670 |
| 6,148,316 A * | 11/2000 | Herbert | ..................... | G06F 7/57 708/505 |
| 6,401,194 B1 * | 6/2002 | Nguyen | ..................... | G06F 7/57 712/210 |
| 6,529,928 B1 * | 3/2003 | Resnick | ................. | G06F 7/485 708/505 |

* cited by examiner

*Primary Examiner* — Andrew Caldwell
*Assistant Examiner* — Phat N Le
(74) *Attorney, Agent, or Firm* — Innovation Counsel LLP

(57) ABSTRACT

An artificial intelligence (AI) calculation circuit is provided. The AI calculation circuit can support various integer and floating-point calculations through the adjustment of circuit configuration. Integer multiplication and floating-point mantissa multiplication share the multiplication unit, integer comparison and floating-point comparison share the same comparison unit, integer addition and floating-point addition share the same addition unit.

7 Claims, 3 Drawing Sheets

AI CALCULATION CIRCUIT

This application claims the benefit of People's Republic of China application Ser. No. 202011480407.0, filed Dec. 15, 2020, the subject matter of which is incorporated herein by reference.

BACKGROUND OF THE INVENTION

Field of the Invention

The invention relates in general to a mixed-precision artificial intelligence (AI) calculation circuit.

Description of the Related Art

The processor for performing AI calculation normally adopts one of Int8, BF16 and FP32 as the data format. In terms of calculation precision, FP32 is the highest, BF16 is the second, and Int8 is the lowest. In terms of calculation speed (or referred as computing power), Int8 is the highest, BF16 is the second, and FP32 is the lowest. That is, it is difficult for the AI processor to meet the requirement of calculation precision and the requirement of calculation speed using one data format.

SUMMARY OF THE INVENTION

According to one embodiment of the present invention, an AI calculation circuit is provided. The AI calculation circuit includes several calculation circuits. Each calculation circuit includes a floating-point multiplication module, a floating-point addition module and a storage module. The floating-point multiplication module includes a first selection unit, a second selection unit and a multiplication unit. A first input end of the first selection unit is configured to receive a first numeric data, and a second input end of the first selection unit is configured to receive several mantissa bits of the first numeric data. A first input end of the second selection unit is configured to receive a second numeric data, and a second input end of the second selection unit is configured to receive several mantissa bits of the second numeric data. The multiplication unit is coupled to the first selection unit and the second selection unit. The floating-point addition module includes a comparison unit, a third selection unit, a fourth selection unit and an addition unit. The comparison unit is configured to receive the first numeric data and the second numeric data. A first input end of the third selection unit is configured to receive the first numeric data, and a second input end of the third selection unit is configured to receive the mantissa bits of the first numeric data. A first input end of the fourth selection unit is configured to receive the second numeric data, and a second input end of the fourth selection unit is configured to receive the mantissa bits of the second numeric data. The addition unit is coupled to the first selection unit and the second selection unit. The storage module is coupled to the floating-point multiplication module and the floating-point addition module. When the format of the first numeric data is integer format, the first selection unit, the second selection unit, the third selection unit and the fourth selection unit selectively output through the first input ends. When the format of the first numeric data is floating-point format, the first selection unit, the second selection unit, the third selection unit and the fourth selection unit selectively output through the second input ends.

The above and other aspects of the invention will become better understood with regard to the following detailed description of the preferred but non-limiting embodiment (s). The following description is made with reference to the accompanying drawings.

DETAILED DESCRIPTION OF THE INVENTION

The principles of the structures and operations of the present invention are disclosed below with accompanying drawings.

To more clearly illustrate the technical content of the present invention, detailed descriptions of the format of numeric data in binary calculation are disclosed below. In Int8, the format of numeric data is integer with a sign. According to the Int8 format, the 8-th bit counted from the right is a sign bit which represents whether the numeric value is positive or negative, and the 1st to the 7-th bits represent the value of the numeric data. Thus, Int8 can represent integer values from −128 to +127. The binary floating-point can be represented as $[(+, -) a \times b^{\wedge}c]$, wherein $(+, -)$ is a sign symbol which represents whether the numeric value is positive or negative; the designation x represents multiplication, a represents mantissa, b represents base (that is, 2); the designation c represents exponent. According to the BF16 format, the 16-th bit (the most significant bit) counted from the right is a sign bit which represents whether the numeric value is positive or negative, the 8-th to the 15-th bits counted from the right represent exponent bits, the $1^{st}$ to the 7-th bits counted from the right represent mantissa bits, and there are a total of 16 bits. In TF32, the 19-th bit (the most significant bit) counted from the right is a sign bit which represents whether the numeric value is positive or negative, the 11-th to the 18-th bits counted from the right represent exponent bits, the first to the 10-th bits counted from the right represent mantissa bits, and there are a total of 19 bits.

Figure 1:
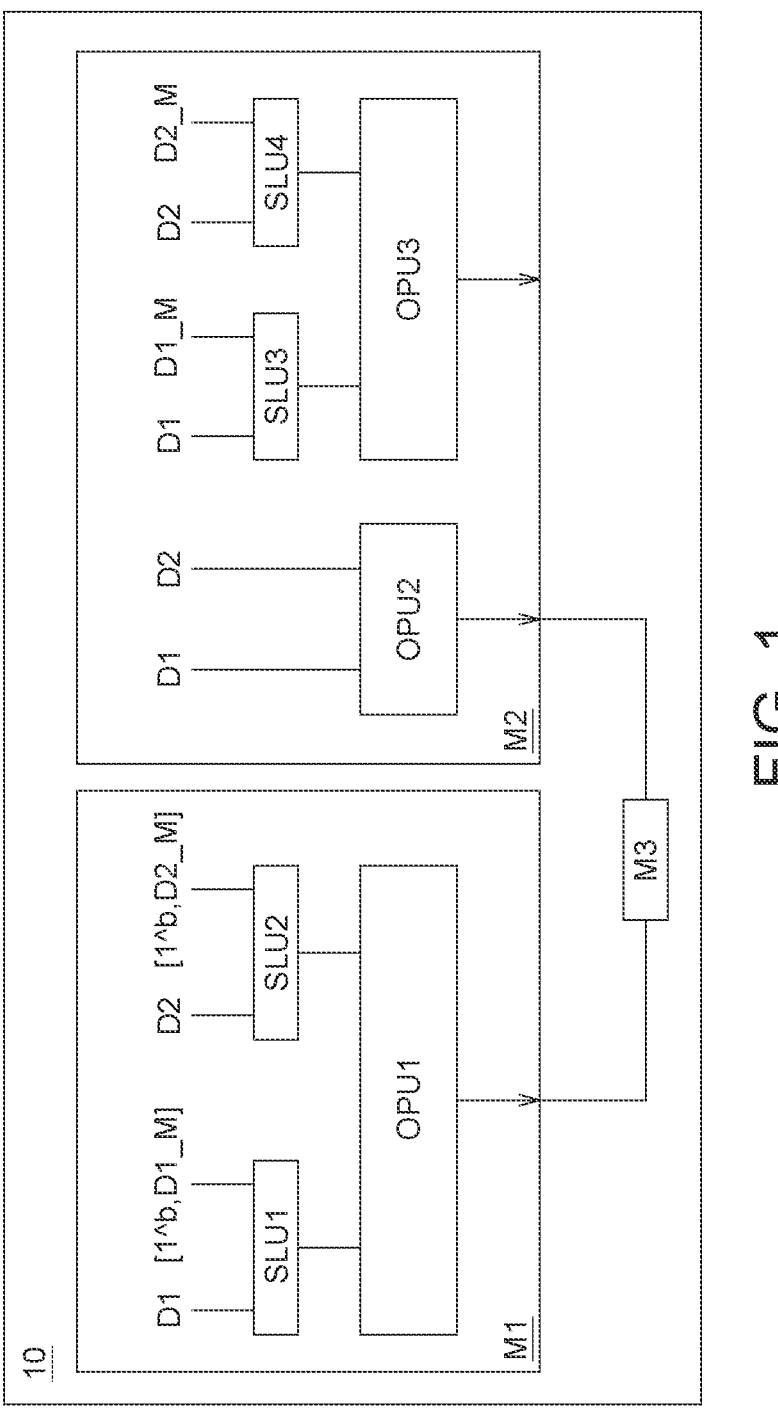
FIG. 1 is a block diagram of a mixed-precision AI calculation circuit according to an embodiment of the present invention.

Referring to FIG. 1, a block diagram of a mixed-precision AI calculation circuit according to an embodiment of the present invention is shown. The AI calculation circuit 10 can perform several mathematical calculations, such as addition, subtraction, multiplication, maximum taking, and minimum taking according to a first numeric data D1 and a second numeric data D2. In the present embodiment, the format of the first and second numeric data can be integer format, such as Int8, or can be floating-point format, such as BF16 and TF32.

The AI calculation circuit 10 includes a floating-point multiplication module M1, a floating-point addition module M2 and one or several storage modules M3. Generally speaking, an AI processor may include several AI calculation circuits 10 in response to the large volume of AI calculations.

The floating-point multiplication module M1 includes a multiplication unit OPU1 and two selection units SLU1 and SLU2. A first input end of the selection unit SLU1 is configured to receive the first numeric data D1, and a second input end of the selection unit SLU1 is configured to receive the mantissa bits D1_M (here below represented as [1ˆb, D1_M]) of the first numeric data, wherein 1 bit "1" is added to the mantissa bits D1_M as the most significant bit. A first input end of the selection unit SLU2 is configured to receive the second numeric data D2, a second input end of the selection unit SLU2 is configured to receive the mantissa bit D2_M (here below represented as [1ˆb, D2_M]) of the second numeric data, wherein 1 bit "1" is added to the mantissa bits D2_M as the most significant bit. It should be noted that according to the floating-point format, the integer part of the normalized floating-point mantissa is "1". To save the space of 1 bit, the mantissa bits normally only contain the decimal part after the decimal point and does not contain the bit "1" before the decimal point, and before calculation is performed, "1" is added to the left-most side of the mantissa bits as the most significant bit.

When the format of the first and second numeric data is integer format, the selection units SLU1 and SLU2 are controlled by a control signal outputted from a control unit to selectively output through the first input end. When the format of the first and second numeric data is floating-point format, the selection units SLU1 and SLU2 are controlled by a control signal outputted from a control unit to selectively output through the second input end. To put it in greater details, when the format of the first and second numeric data is integer format, the second input ends of the selection units SLU1 and SLU2 will receive mantissa processed first numeric data and second numeric data. Since the format of the first and second numeric data is integer format, the mantissa processed first numeric data and second numeric data received by the first input ends of the selection units SLU1 and SLU2 will be erroneous data. However, the erroneous data received by the first input ends of the selection units SLU1 and SLU2 will be outputted through the second input ends of the selection units SLU1 and SLU2 by the control unit and will not be selected, and vice versa. The multiplication unit OPU1 is configured to receive the output of the selection units SLU1 and SLU2 and to perform multiplication according to the output of the selection units SLU1 and SLU2. That is, when the format of the first and second numeric data is integer format, the multiplication unit OPU1 performs multiplication according to the first and second numeric data and obtains a product of the first numeric data and the second numeric data. When the format of the first and second numeric data is floating-point format, the multiplication unit OPU1 performs multiplication according to [1ˆb, the mantissa bits of the first numeric data] and [1ˆb, the mantissa bits of the second numeric data] and obtains a product of [1ˆb, the mantissa bits of the first numeric data] and [1ˆb, the mantissa bits of the second numeric data], that is, a part of the floating-point calculation and mantissa multiplication.

Furthermore, the floating-point multiplication module M1 further includes an addition unit (not illustrated) and an XOR calculation unit (not illustrated). When the format of the first and second numeric data is floating-point format, the addition unit (not illustrated) is configured to calculate the addition of the exponent bits of the first and second numeric data, and the XOR calculation unit (not illustrated) is configured to process the sign bits of the first and second numeric data. When the format of the first and second numeric data is integer format, the output of the two calculation units will not be selected (the calculation result is incorrect). The product of the first numeric data and the second numeric data can be obtained by integrating the output of the multiplication unit OPU1, the sum of the exponent bits of the first and second numeric data and the result of sign processing.

The floating-point addition module M2 includes a comparison unit OPU2, an addition unit OPU3 and selection units SLU3 and SLU4. The comparison unit OPU2 is configured to receive the first numeric data and the second numeric data and perform comparison to determine the size relationship between the first numeric data and the second numeric data. A first input end of the selection unit SLU3 is configured to receive the first numeric data, and a second input end of the selection unit SLU3 is configured to receive the larger one of the first numeric data and the second numeric data. A first input end of the selection unit SLU4 is configured to receive the second numeric data, and a second input end of the selection unit SLU4 is configured to receive the smaller one of the first numeric data and the second numeric data. When the format of the first and second numeric data is integer format, the selection units SLU3 and SLU4 are controlled by the control signal of the control unit to selectively output through the first input end. When the format of the first and second numeric data is floating-point format, the selection units SLU3 and SLU4 are controlled by the control signal of the control unit to selectively output through the second input end. The addition unit OPU3 performs addition according to the output of the selection units SLU3 and SLU4. To put it in greater details, the decimal points need to be aligned in floating-point calculation, therefore the floating-point calculation needs to compare the size relationship between the first numeric data and the second numeric data size before performing addition, but the integer calculation does not need to perform the said comparison. That is, when the format of the first and second numeric data is integer format, the addition unit OPU3 performs addition according to the first and second numeric data to obtain a sum of the first numeric data and the second numeric data. When the format of the first and second numeric data is floating-point format, the addition unit OPU3 performs addition according to the first and second numeric data to obtain an initial calculation result of the addition of the first numeric data and the second numeric data.

Furthermore, the floating-point addition module M2 further includes a prediction unit (not illustrated) and an error correction unit (not illustrated). In an embodiment, the prediction calculation unit uses LZA (leading zero anticipator) to predict the first position of "0" after addition is performed. When the format of the first and second numeric data is floating-point format, the prediction unit and the addition unit OPU3 calculate a predictive value of the sum at the same time according to the first and second numeric data. Meanwhile, the error correction unit compares the initial calculation result outputted from the addition unit OPU3 with the predictive value of the sum to determine whether to correct the initial calculation result. Examples of correction include translating the initial calculation result to the left by 1 bit. That is, if correction is not needed, the initial calculation result outputted from the addition unit OPU3 is the sum of the first numeric data and the second numeric data (floating-point); if correction is needed, the corrected initial calculation result is the sum of the first numeric data and the second numeric data (floating-point).

The storage module M3 includes several trigger units (not illustrated). The storage module M3 is configured to store each calculation result obtained according to the first numeric data and the second numeric data.

The control unit can be configured inside or outside the AI calculation circuit 10, and the present invention does not have specific restrictions regarding the said arrangement.

In an embodiment, the AI calculation circuit 10 further performs summation of products. For example, in the first round of calculation, the first and second numeric data are registered to the floating-point multiplication module M1, and the first result obtained from calculation is stored to the storage module M3; in the second round of calculation, the new first and second numeric data are registered to the floating-point multiplication module M1, and the second result obtained from calculation and the first result stored in the storage module M3 are inputted to the floating-point addition module M2, the third result obtained from calculation is stored to the storage module M3, and the rest can be obtained by the same analogy. Thus, the AI calculation circuit 10 can add up several products of the first numeric data and the second numeric data to obtain a sum of products. It should be noted that since the precision of multiplication is intact and is completely inputted for accumulation, rounding error treatment is performed once only after the last accumulation is completed. In comparison to the conventional method, in which multiplication and addition are separately performed and the rounding error treatment is performed twice, that is, one upon the completion of multiplication and the other upon the completion of addition, the final error in the method of the present embodiment is smaller.

The AI processor requires a higher calculation speed. In practice, there are a large number, such as hundreds or thousands, of AI calculation circuits 10 included in an AI processor. The multiplication unit, the addition unit and the comparison unit are essential circuits in integer calculation and floating-point calculation and occupy a considerable size of area. The design of selecting the input mode by the selection unit allows integer calculation and floating-point calculation to share the same multiplication unit, the same addition unit and the same comparison unit, therefore a large size of area can be saved.

Figure 2:
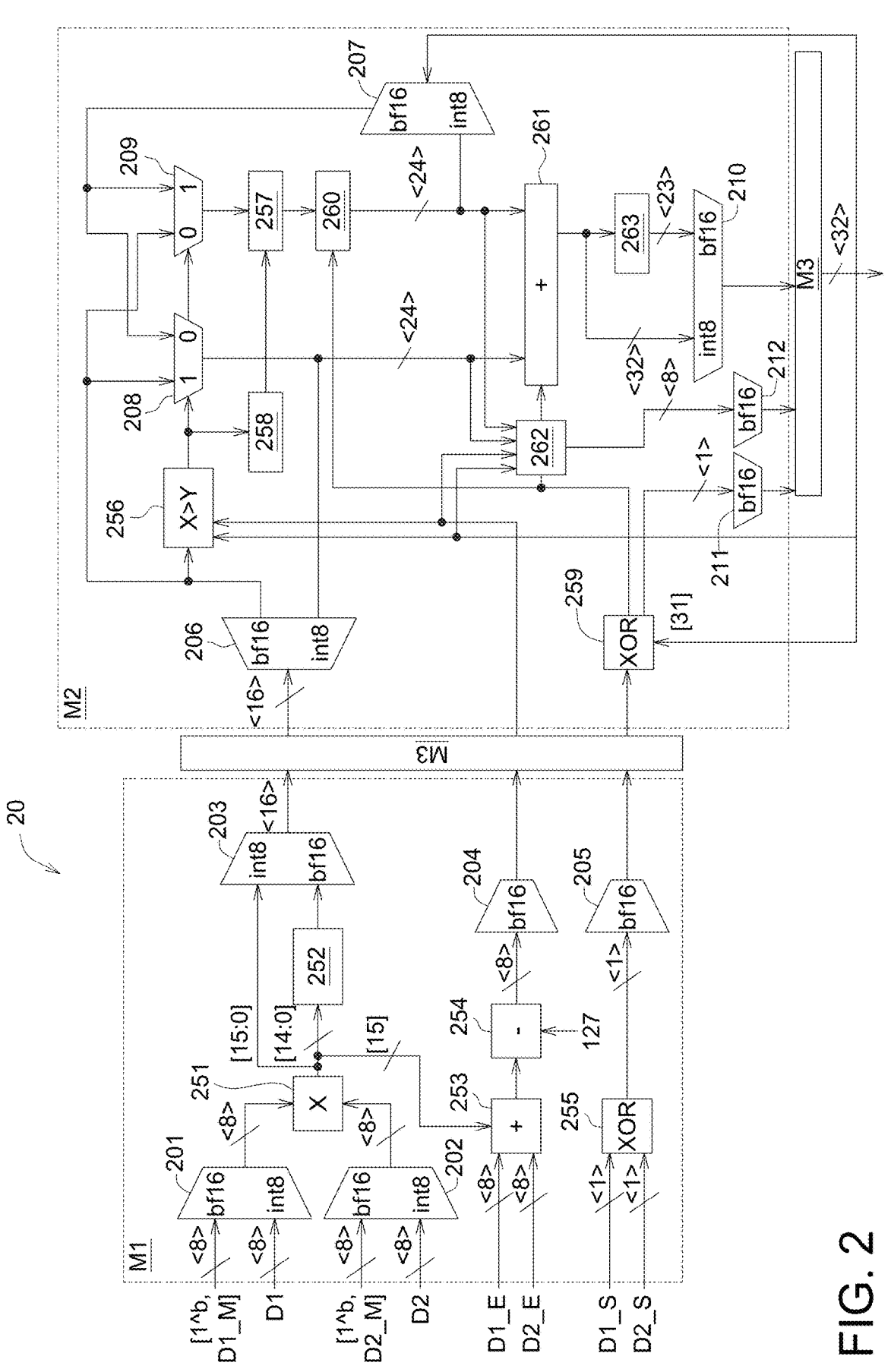
FIG. 2 is a circuit block diagram of an AI calculation circuit according to an embodiment of the present invention.

Referring to FIG. 2, a circuit block diagram of an AI calculation circuit according to an embodiment of the present invention is shown. The AI calculation circuit 20 shows further details of the AI calculation circuit 10. In FIG. 2, the AI calculation circuit 20 is exemplified by the circuit configuration configured to perform summation of products. For the purpose of simplification, some selection units are omitted in FIG. 2. In the present embodiment, integer format and floating-point format are exemplified by Int8 and BF16 respectively, that is, the AI calculation circuit 20 is an Int8 and BF16 mixed-precision calculation circuit. Descriptions of the designations of FIG. 2 are disclosed below. The designation <X>represents that there are X bits transmitted on the said path. For example, <8> represents there are 8 bits transmitted on the said path. The designation [Y] represents that the Y-th bit, which counts for 1 bit, is taken from the data transmitted on the path. For example, the designation [15] represents that the 15-th bit is taken from the data transmitted on the path (the right-most bit is the 0-th bit, that is, the least significant bit). The designation [A:B] represents that the B-th to the A-th bits, counted from the right and counting for (A−B+1) bits, are taken from the data transmitted on the path. For example, the designation [14:0] represents that the 0-th to the 14-th bits, counted from the right and counting for 15 bits, are taken from the data transmitted on the path. The designations Int8 or BF16 marked on the path represent that the said path will be selected when the corresponding format is used. For example, the path marked Int8 represents that the said path will be selected when the format of the first and second numeric data is integer format (Int8), the path marked BF16 represents that the said path will be selected when the format of the first and second numeric data is floating-point format (BF16).

The AI calculation circuit 20 includes a floating-point multiplication module M1, a floating-point addition module M2 and a storage module M3. The floating-point multiplication module M1 includes selection units 201~205 and calculation units 251~255. The selection units 201 and 202 are equivalent to the selection units SLU1 and SLU2 of FIG. 1. The calculation unit 251 is an 8-bit multiplier and is equivalent to the multiplication unit OPU1 of FIG. 1. The calculation unit 251 is coupled to the selection units 201 and 202. The calculation unit 252 is coupled to the calculation unit 251. The calculation unit 252 is configured to normalize the floating-point calculation then output the normalized calculation. As disclosed above, in the floating-point calculation, the normalized floating-point representation is 1.xxx, that is, the integer part before the decimal point is 1. However, the integer part of the output of the calculation unit 251 could be 11 or 10, such as 10.xxx or 11.xxx due to the carry in multiplication. Meanwhile, the normalization is to shift the decimal point to the left by 1 bit and make the integer part become 1.0xx or 1.1xxx to comply with the normalized floating-point representation. Thus, the calculation unit 252 takes the 0-th to the 14-th bits, which count for 15 bits, from the output of the calculation unit 251 and adds 1 bit "0" as the most significant bit to count for 16 bits, then outputs the 16 bits. The selection unit 203 is coupled to the selection units 201 and 202. The selection unit 203 is controlled by control signal. When the format of the first and second numeric data is integer format, the output of the selection unit 201 is selected as the output. When the format of the first and second numeric data is floating-point format, the output of the selection unit 202 is selected as the output. The selection units 201~203 and the calculation units 251~252 can realize integer multiplication and the part of mantissa multiplication in floating-point multiplication.

The calculation unit 253 is an adder configured to receive the exponent bit D1_E of the first numeric data, the exponent bit D2_E of the second numeric data and the 15-th bit of the output of the calculation unit 251 (the carry in mantissa multiplication) and to perform addition according to the received bits. The calculation unit 254 is a subtractor coupled to the calculation unit 253. The calculation unit 254 is configured to deduct the output of the calculation unit 253 by 127 (decimal) to comply with the IEEE 754 format of the Institute of Electrical and Electronics Engineers. The selection unit 204 is coupled to the calculation unit 254. The selection unit 204 is controlled by control signal. When the format of the first and second numeric data is integer format, the selection unit 204 does not perform output. When the format of the first and second numeric data is floating-point format, the selection unit 204 outputs the output of the calculation unit 254. The selection unit 204 and the calculation units 253 and 254 can realize the addition of exponents in floating-point multiplication.

The calculation unit 255 is an XOR gate configured to receive the sign bit D1_S of the first numeric data and the sign bit D2_S of the second numeric data and to perform XOR calculation according to the received bits. The selection unit 205 is coupled to the calculation unit 255. The selection unit 205 is controlled by control signal. When the format of the first and second numeric data is integer format, the selection unit 205 does not perform output. When the format of the first and second numeric data is floating-point format, the selection unit 205 outputs the output of the calculation unit 255. The selection unit 205 and the calculation unit 255 can realize the multiplication of signs in the floating-point multiplication.

When the format of the first and second numeric data is integer format, the output of the selection unit 203 (the product of the first numeric data and the second numeric data) is inputted and stored to the storage module M3. When the format of the first and second numeric data is floating-point format, the output of the selection units 203~205 (the result of mantissa multiplication, exponent addition and sign multiplication of the first numeric data and the second numeric data) is inputted and stored to the storage module M3. The output of the selection units 203~205 is arranged in a sequence complying with the floating-point format. It should be noted that the floating-point product obtained in this way maintains the precision of the original data.

The floating-point addition module M2 includes selection unit 206~211 and calculation units 256~263.

The selection unit 206 is coupled to the storage module M3. The selection unit 206 receives the output of the selection unit 203 from the storage module M3. The calculation unit 256 is equivalent to the calculation unit OPU2 of FIG. 1. The calculation unit 256 is coupled to the selection unit 206 and the storage module M3.

When the format of the first and second numeric data is floating-point format, the calculation unit 256 compares the product of the first numeric data and the second numeric data exclusive of sign bits (hereinafter referred as V1) with a sum of products exclusive of sign bits (hereinafter referred as V2) stored in the storage module M3 to obtain the size relationship between V1 and V2. If V1 is greater than V2, the calculation unit 256 outputs "1". If V1 is not greater than V2, the calculation unit 256 outputs "0". Besides, during the comparison between V1 and V2, the calculation unit 256 also obtains the size relationship between the exponent in the product of the first numeric data and the second numeric data and the exponent in the sum of products and further outputs the size relationship between the exponents to the calculation unit 257. The selection unit 207 is coupled to the storage module M3.

When the format of the first and second numeric data is integer format, the selection unit 207 is configured to receive the sum of products from the storage module M3. When the format of the first and second numeric data is floating-point format, the selection unit 207 is configured to receive the mantissa bits of the sum of products from the storage module M3. The selection unit 208 is coupled to the selection units 206 and 207 and the calculation unit 256. The selection unit 209 is coupled to the selection units 206 and 207 and the calculation unit 256.

When the format of the first and second numeric data is floating-point format, the selection units 208 and 209 receive the output from the selection units 206 and 207 and are controlled by the output of the calculation unit 256. When the calculation unit 256 output "1", the selection unit 208 selectively outputs the output of the selection unit 206, and the selection unit 209 selectively outputs the output of the selection unit 207. When the calculation unit 256 output "0", the selection unit 208 selectively outputs the output of the selection unit 207, and the selection unit 209 selectively outputs the output of the selection unit 206.

The calculation unit 257 is coupled to the calculation unit 256. The calculation unit 257 determines whether to align the decimal points of V1 and V2 according to the size relationship outputted from the calculation unit 256, that is, the size relationship between the exponent in the product of the first numeric data and the second numeric data the exponent in the sum of products and whether to transmit the aligned result to the calculation unit 258.

The calculation unit 258 is coupled to the calculation unit 257. Based on the determination outputted from the calculation unit 257, the calculation unit 258 translates the smaller one of V1 and V2 to the right by 1 or several bits if the determination outputted from the calculation unit 257 indicates that the decimal points of V1 and V2 need to be aligned. The number of bits to be translated is determined according to the difference between the exponent bits of V1 and V2.

The calculation unit 259 is coupled to the storage module M3. The calculation unit 259 is an XOR gate configured to perform XOR calculation according to the sign bit of the product of the first numeric data and the second numeric data and the sign bit of the sum of products, that is, to determine whether the sign bit of the product of the first numeric data and the second numeric data and the sign bit of the sum of products are identical. The calculation unit 260 is coupled to the calculation unit 259.

The calculation unit 260 determines whether to perform two supplementary operations on the smaller one of V1 and V2 (that is, reversing and adding 1) according to the result of XOR calculation outputted from the calculation unit 259. When the result of XOR calculation outputted from the calculation unit 259 is "1" (that is, the sign of the product of the first numeric data and the second numeric data and the sign of the sum of products are different: one is "+" and the other one is "−"), the calculation unit 260 performs two supplementary operations on the smaller one of V1 and V2. When the result of XOR calculation outputted from the calculation unit 259 is "0" (that is, the sign of the product of the first numeric data and the second numeric data and the sign of the sum of products are identical: both are "+" or "−"), the calculation unit 260 does not perform extra operations, that is, the calculation unit 260 does not perform two supplementary operations on the smaller one of V1 and V2.

The calculation unit 261 is an adder, which is equivalent to the calculation unit OPU3 of FIG. 1. Since FIG. 2 illustrates the summation of products, the selection units SLU3 and SLU4 of FIG. 1 are omitted. The calculation unit 261 is an adder coupled to the selection units 206-208, and the calculation unit 259 (used as the carry value of the calculation unit 261) and the calculation unit 260. When the format of the first and second numeric data is integer format, the two inputs of the calculation unit 261 are received from the selection units 206 and 207 respectively. When the format of the first and second numeric data is floating-point format, the two inputs of the calculation unit 261 are received from the selection unit 208 and the calculation unit 260 respectively.

The calculation unit 262 is coupled to the selection unit 208 and the calculation units 259-261. The calculation unit 262 is a floating-point addition acceleration circuit. The calculation unit 262 and the calculation unit 261 perform calculation at the same time according to the outputs of the selection unit 208 and the calculation units 259 and 26. The calculation unit 262 (for example, using LZA) predicts the position of the leading zero of the output of the selection unit 208 subtracted by the output of the calculation unit 260 to obtain a predictive result, and further transmit the predictive result to the calculation unit 261 to reduce the critical path of floating-point addition and subtraction. The output of the calculation unit 261 is inputted to the calculation unit 262 at the same time. Then, the calculation unit 262 compares the predictive result with the output of the calculation unit 261

(actual result of addition) to determine whether the predictive result is correct or not and accordingly output a correction instruction and a corrected exponent bit. The calculation unit 263 is coupled to the calculation units 261 and 262.

The calculation unit 263 determines whether to correct the output of the calculation unit 261 according to the correction instruction received from the calculation unit 262. When the correction instruction is to perform correction, the calculation unit 263 translates the output result of the calculation unit 261 to the left by 1 bit. It should be noted that the calculation unit 263 outputs the 23 least significant bits of the output of the calculation unit 261. The selection unit 210 is coupled to the calculation units 261 and 263, and the storage module M3 and is controlled by control signal. When the format of the first and second numeric data is integer format, the selection unit selectively outputs the output of the calculation unit 261 to the storage module M3. When the format of the first and second numeric data is floating-point format, the selection unit selectively outputs the output of the calculation unit 263 to the storage module M3.

The selection unit 211 is coupled to the calculation unit 259 and the storage module M3, and the selection unit 212 is coupled to the calculation unit 262 and the storage module M3. The selection units 211 and 212 are controlled by a control signal. When the format of the first and second numeric data is floating-point format, the output of the calculation unit 259 and the exponent bit corrected by the calculation unit 262 are outputted to the storage module M3. Thus, the sum of the product of the first numeric data and the second numeric data and the sum of accumulated products can be obtained.

In the present embodiment, actually implementable calculations include FP32 addition, subtraction, maximum taking, and minimum taking, BF16 multiplication and summation of products, Int8 addition, subtraction, multiplication, maximum taking, minimum taking, and summation of products, and Int16 addition, subtraction, maximum taking, and minimum taking. In another embodiment, when the calculation unit 261 is set as a 32-bit adder, the calculation unit 261 can support Int16 addition, subtraction, maximum taking, and minimum taking and even can further support Int24 Int32 addition, subtraction, maximum taking, and minimum taking. That is, the AI calculation circuit 20 can support various formats of numeric data as long as the upper limit of the number of bits allows.

In terms of the size of area, if the conventional design of Synopsys Designware is 100%, the design of the present embodiment is 56%, that is, the design of the present embodiment saves 44% of area in comparison to the conventional design of Synopsys Designware. In terms of calculation speed, if the calculation speed of the present embodiment is 100%, the calculation speed of the conventional design of Synopsys Designware is only 91% of the present embodiment. Furthermore, in terms of calculation types, conventional design of Synopsys Designware can only perform FP32 addition and Int8 multiplication.

Figure 3:
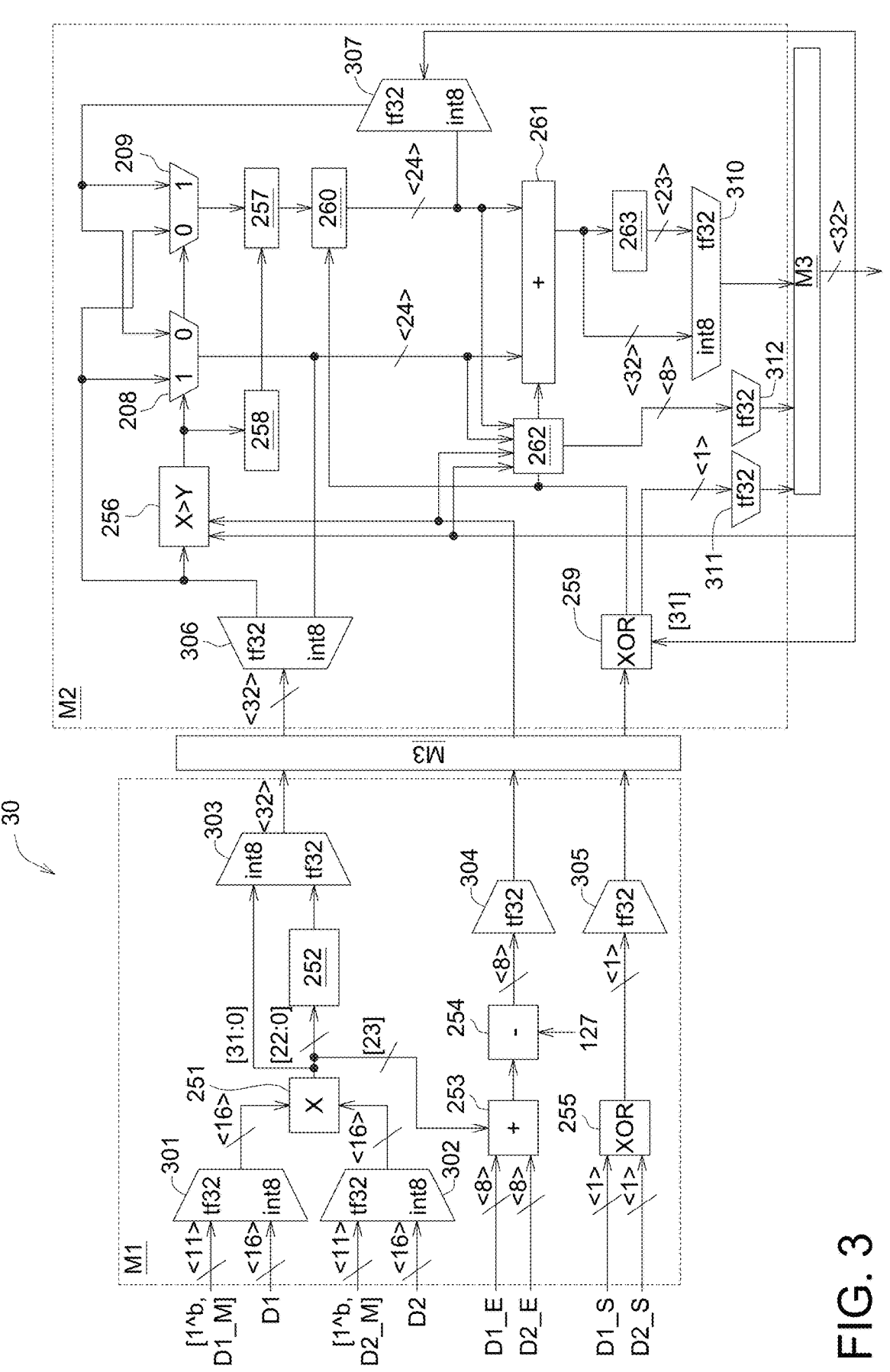
FIG. 3 is a circuit block diagram of an AI calculation circuit according to another embodiment of the present invention.

Referring to FIG. 3, a circuit block diagram of an AI calculation circuit according to another embodiment of the present invention is shown. The AI calculation circuit 30 is similar to the AI calculation circuit 20 but is different in that the floating-point format of the AI calculation circuit 30 supports TF32, and a part of the path and the number of bits of the calculation unit are adaptatively modified.

In the present embodiment, the implementable calculations performed include FP32 addition, subtraction, maximum taking, and minimum taking, TF32 multiplication and summation of products, BF16 multiplication and summation of products, Int16 multiplication and summation of products, Int8 addition, subtraction, multiplication, maximum taking, minimum taking, and summation of products, and Int16 (or Int24, or Int32) addition, subtraction, maximum taking, and minimum taking. That is, the AI calculation circuit 30 can support various formats of numeric data as long as the upper limit of the number of bits allows.

In terms of the size of area, if the conventional design of Synopsys Designware is 100%, the design of the present embodiment is 68%, that is, the design of the present embodiment saves 32% of area in comparison to the conventional design of Synopsys Designware. In terms of calculation speed, if the calculation speed of the present embodiment is 100%, the calculation speed of the conventional design of Synopsys Designware is only 91% of the present embodiment. Furthermore, in terms of the calculation types, conventional design of Synopsys Designware can only perform FP32 addition and Int8 multiplication.

In response to different formats of numeric data, the AI calculation circuit of the present invention can switch to a corresponding circuit configuration and advantageously possesses the features of high calculation speed, high efficiency, high precision and low area.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An AI calculation circuit, characterized in comprising:
    a plurality of calculation circuits, each comprising:
        a floating-point multiplication module, comprising a first selection unit, a second selection unit and a multiplication unit, wherein a first input end of the first selection unit is configured to receive a first numeric data, a second input end of the first selection unit is configured to receive a plurality of mantissa bits of the first numeric data, a first input end of the second selection unit is configured to receive a second numeric data, a second input end of the second selection unit is configured to receive a plurality of mantissa bits of the second numeric data, and the multiplication unit is coupled to the first selection unit and the second selection unit;
        a floating-point addition module, comprising a comparison unit, a third selection unit, a fourth selection unit and an addition unit, wherein the comparison unit is configured to receive the first numeric data and the second numeric data, a first input end of the third selection unit is configured to receive the first numeric data, a second input end of the third selection unit is configured to receive the mantissa bits of the first numeric data, a first input end of the fourth selection unit is configured to receive the second numeric data, a second input end of the fourth selection unit is configured to receive the mantissa bits of the second numeric data, and the addition unit is coupled to the third selection unit and the fourth selection unit; and
        a storage module coupled to the floating-point multiplication module and the floating-point addition module, wherein when the format of the first numeric data is integer format, the first selection unit, the second selection unit, the third selection unit and the fourth selection unit selectively output through the first input ends; when the format of the first numeric data is floating-point format, the first selection unit, the second selection unit, the third selection unit and the fourth selection unit selectively output through the second input ends.

2. The AI calculation circuit according to claim 1, wherein the integer format is Int8, and the floating-point format is BF16 or TF32.

3. The AI calculation circuit according to claim 1, wherein when the format of the first numeric data is integer format, the multiplication unit performs integer multiplication according to the first and second numeric data; when the format of the first numeric data is floating-point format, the multiplication unit performs floating-point multiplication according to the mantissa bits of the first numeric data and the mantissa bits of the second numeric data.

4. The AI calculation circuit according to claim 1, wherein the comparison unit is configured to compare the size relationship between the first numeric data and the second numeric data; when the format of the first and second numeric data is floating-point format, the comparison unit compares the size relationship between the first numeric data not containing a sign bit and the second numeric data not containing a sign bit.

5. The AI calculation circuit according to claim 1, wherein when the format of the first numeric data is integer format, the addition unit performs integer addition according to the first and second numeric data; when the format of the first numeric data is floating-point format, the addition unit performs floating-point addition according to the mantissa bits of the first numeric data and the mantissa bits of the second numeric data.

6. The AI calculation circuit according to claim 1, wherein the floating-point multiplication module further comprises an addition unit configured to receive a plurality of exponent bits of the first numeric data and a plurality of exponent bits of the second numeric data and to perform addition according to the exponent bits of the first numeric data and the exponent bits of the second numeric data.

7. The AI calculation circuit according to claim 1, wherein the floating-point multiplication module further comprises an XOR calculation unit configured to receive a sign bit of the first numeric data and a sign bit of the second numeric data and to perform XOR calculation according to the sign bit of the first numeric data and the sign bit of the second numeric data.

\*   \*   \*   \*   \*